(12) United States Patent
Yamaguchi et al.

(10) Patent No.: US 9,815,421 B2
(45) Date of Patent: Nov. 14, 2017

(54) CORE UNIT AND WIRE HARNESS

(71) Applicants: Yazaki Corporation, Tokyo (JP); TOYOTA JIDOSHA KABUSHIKI KAISHA, Toyota-shi, Aichi-ken (JP)

(72) Inventors: Yasuhiro Yamaguchi, Shizuoka (JP); Hayato Iizuka, Shizuoka (JP); Takeshi Innan, Shizuoka (JP); Hiroshi Aihara, Toyota (JP)

(73) Assignees: YASAKI CORPORATION, Minato-ku (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/378,818

(22) Filed: Dec. 14, 2016

(65) Prior Publication Data

US 2017/0174152 A1 Jun. 22, 2017

(30) Foreign Application Priority Data

Dec. 18, 2015 (JP) .................. 2015-247975

(51) Int. Cl.

| B60R 16/02 | (2006.01) |
| H01B 9/02 | (2006.01) |
| H01B 7/42 | (2006.01) |
| H01B 7/00 | (2006.01) |
| H01F 3/00 | (2006.01) |
| H01F 17/06 | (2006.01) |

(52) U.S. Cl.
CPC ....... *B60R 16/0207* (2013.01); *H01B 7/0045* (2013.01); *H01B 7/426* (2013.01); *H01B 9/02* (2013.01); *H01F 3/00* (2013.01); *H01F 2017/065* (2013.01)

(58) Field of Classification Search
CPC .... B60R 16/0207; H01B 7/0045; H01B 9/02; H01B 7/426
USPC ......................................... 174/72 A
See application file for complete search history.

(56) References Cited

U.S. PATENT DOCUMENTS

| 4,975,672 A * | 12/1990 | McLyman ............. H01F 17/062 |
| | | 174/DIG. 8 |
| 2011/0148232 A1* | 6/2011 | Mori .................... H02K 21/044 |
| | | 310/71 |

(Continued)

FOREIGN PATENT DOCUMENTS

JP 2012-230851 A 11/2012

*Primary Examiner* — Timothy Thompson
*Assistant Examiner* — Charles Pizzuto
(74) *Attorney, Agent, or Firm* — Sughrue Mion, PLLC

(57) ABSTRACT

A core unit includes a magnetic substance core formed in an annular shape, electric wires of plural phases being wound around the magnetic substance core at respective positions that are different from each other, and a restriction member that restricts the displacement of the electric wires about the axis of the magnetic substance core, the electric wires being wound around the magnetic substance core. The restriction member has a body fixed to one end of the magnetic substance core in the axial direction, and a plurality of cutout portions are formed in edge portions of the body, the cutout portions surround the respective electric wires wound around the magnetic substance core separately from the inside of the magnetic substance core in the radial direction.

9 Claims, 10 Drawing Sheets

(56) References Cited

U.S. PATENT DOCUMENTS

2016/0336846 A1* 11/2016 Walczak ................. H01F 27/06
2017/0140863 A1*  5/2017 Aichi .................... H01F 17/045

* cited by examiner

CORE UNIT AND WIRE HARNESS

CROSS-REFERENCE TO RELATED APPLICATION(S)

The present application claims priority to and incorporates by reference the entire contents of Japanese Patent Application No. 2015-247975 filed in Japan on Dec. 18, 2015.

BACKGROUND OF THE INVENTION

1. Field of the Invention

The present invention relates to a core unit and a wire harness.

2. Description of the Related Art

Conventionally, in a vehicle, such as a hybrid vehicle or an electric vehicle, an inverter and a motor have been connected with each other via electric wires of three phases to supply power from the inverter to the motor. In such power supply from the inverter to the motor, there exists the case that a steeply risen voltage included in an output from the inverter causes an excessive surge voltage in a wire harness that connects the inverter and the motor, and the surge voltage is input to the motor.

As a method for suppressing such surge voltage, it is effective to wind an electric wire around a magnetic substance core. Here, when a plurality of electric wires are used, in terms of suppressing the increase in number of parts, it is preferable to wind the plurality of electric wires around one magnetic substance core. Japanese Patent Application Laid-open No. 2012-230851 discloses a technique of a wire harness having a primary coil formed by winding a plurality of AC lines around a ferrite core formed in a ring shape.

When the electric wires that are different in phase from each other and wound around the magnetic substance core are brought closer to each other, an electrostatic capacitance between the electric wires becomes large thus lowering cable impedance. There may be a case that the decrease of the cable impedance causes the increase of the surge voltage due to the inconsistency of the impedance in a whole circuit.

SUMMARY OF THE INVENTION

It is an object of the present invention to provide a core unit and a wire harness that are capable of suppressing the decrease of the cable impedance.

In order to achieve the above mentioned object, a core unit according to one aspect of the present invention includes a magnetic substance core formed in an annular shape, electric wires of plural phases being wound around the magnetic substance core at respective positions that are different from each other about the axis of the magnetic substance core; and a restriction member configured to restrict displacement of the electric wires about the axis of the magnetic substance core, the electric wires being wound around the magnetic substance core, wherein the restriction member includes a body fixed to one end of the magnetic substance core in the axial direction of the magnetic substance core, and a plurality of cutout portions are formed in edge portions of the body, the cutout portions is configured to surround the respective electric wires of each phase wound around the magnetic substance core separately from the inside of the magnetic substance core in a radial direction with the axis of the magnetic substance core as a center.

According to another aspect of the present invention, in the core unit, it is preferable that the shapes of the cutout portions correspond to respective winding shapes of the electric wires with respect to the magnetic substance core as viewed from the axial direction of the magnetic substance core.

According to still another aspect of the present invention, in the core unit, it is preferable that each of the cutout portions supports the corresponding electric wire wound around the magnetic substance core from both sides about the axis of the magnetic substance core.

According to still another aspect of the present invention, in the core unit, it is preferable that the restriction member further includes a plurality of fins that project upwardly.

According to still another aspect of the present invention, a wire harness includes a magnetic substance core formed in an annular shape; electric wires of plural phases, the electric wires being wound around the magnetic substance core at respective positions that are different from each other about the axis of the magnetic substance core; and a restriction member configured to restrict displacement of the electric wires about the axis of the magnetic substance core, the electric wires being wound around the magnetic substance core, wherein the restriction member includes a body fixed to one end of the magnetic substance core in the axial direction of the magnetic substance core, the body including a plurality of cutout portions formed in edge portions of the body, and the cutout portions separately surround the respective electric wires of each phase wound around the magnetic substance core from the inside of the magnetic substance core in a radial direction with the axis of the magnetic substance core as a center.

According to still another aspect of the present invention, it is preferable that the wire harness further includes a holding unit that is fixed to a vehicle body and configured to hold the magnetic substance core and the restriction member, wherein the body of the restriction member is a conductive member including a connection portion electrically connected with the holding unit, and the holding unit electrically connects the connection portion and the vehicle body.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a core unit and a wire harness according to embodiments of the present invention are specifically explained with reference to drawings. Here, the present invention is not limited to these embodiments. Furthermore, constitutional features in the following embodiments include a part that is easily conceivable by those skilled in the art, or parts substantially equal to each other.

First Embodiment

Figure 1:
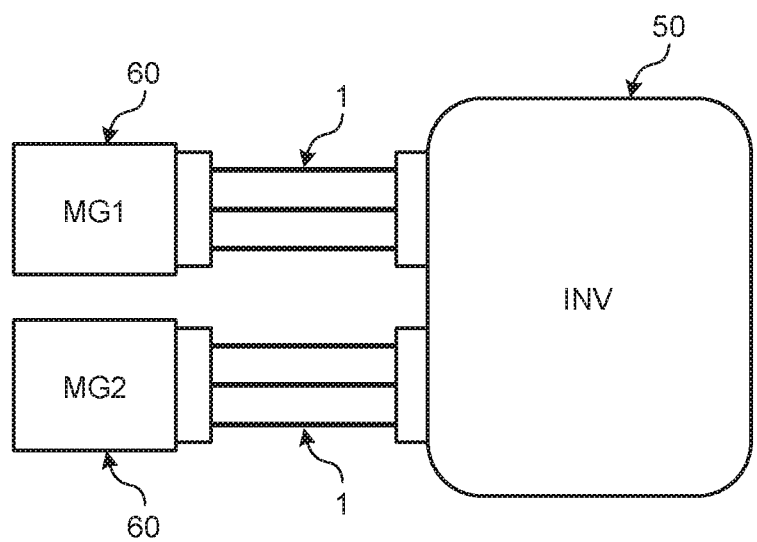
FIG. 1 is a schematic view illustrating a constitution of connecting a motor and an inverter by a wire harness according to a first embodiment.
Figure 2:
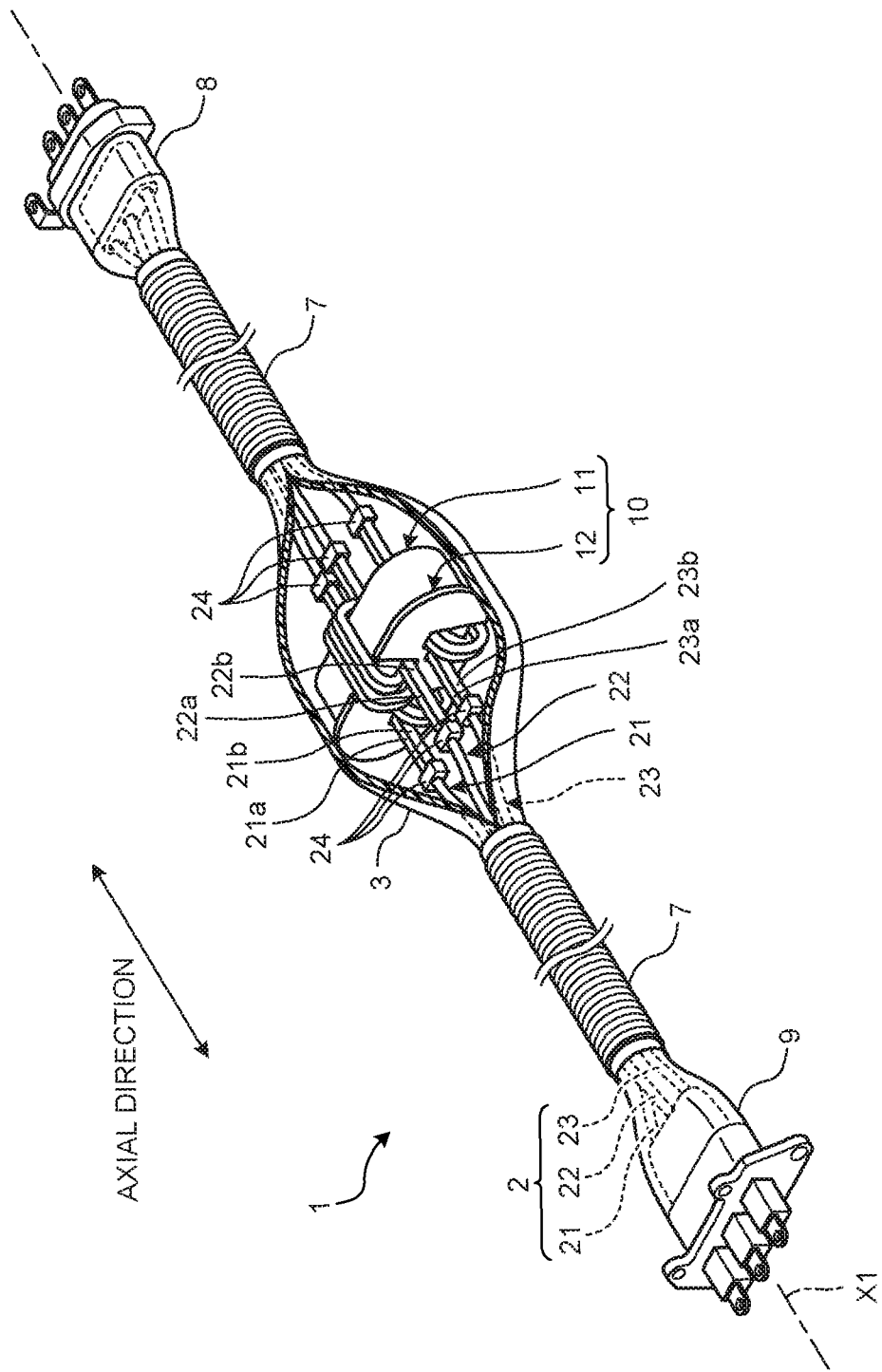
FIG. 2 is a perspective view of the wire harness according to the first embodiment.

A first embodiment is explained with reference to FIG. 1 to FIG. 9. The present embodiment relates to a core unit and a wire harness. FIG. 1 is a schematic view illustrating a constitution of connecting a motor and an inverter by the wire harness according to the first embodiment. FIG. 2 is a perspective view of the wire harness according to the first embodiment.

An inverter 50 and a motor 60 that are illustrated in FIG. 1 are mounted on a vehicle, such as a hybrid vehicle or an electric vehicle. The inverter 50 is a conversion device that converts a DC output from a power source (not illustrated in the drawings) mounted on the vehicle into a three-phase AC output. The inverter 50 may output a PWM waveform, and may also output a sinusoidal waveform. The motor 60 is a device driven by a three-phase AC output from the inverter 50; for example, the motor 60 is a Y-connection three-phase motor.

A wire harness 1 according to the first embodiment is used as a power supply line that connects the above-mentioned three-phase AC-type inverter 50 and the motor 60. The wire harness 1 is wired so as to extend, for example, in the longitudinal direction of the vehicle on the lower side of a floor panel that constitutes a vehicle body. The wire harness 1 is, as illustrated in FIG. 2, a three phase electric wire composed of a three-phase three wire-type electric-wire group that supplies a three-phase AC power by using three electric wires 21, 22, and 23.

Figure 3:
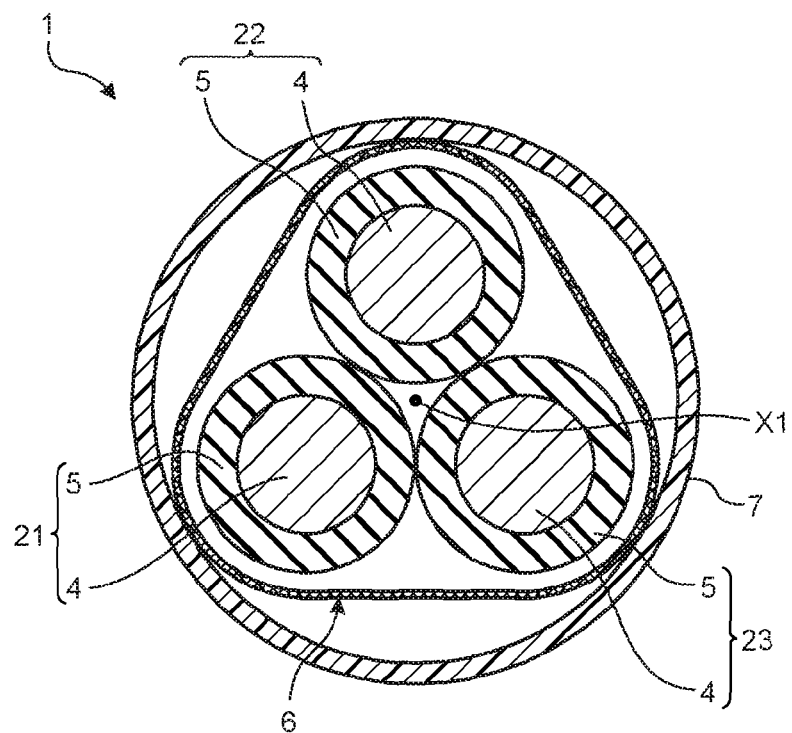
FIG. 3 is a cross-sectional view of an electric wire part in the wire harness according to the first embodiment.

As illustrated in FIG. 2, the wire harness 1 in the first embodiment has an electric wire part 2, an outer shell part (housing) 3, an inverter-side connector 8, a motor-side connector 9, and a core unit 10. The electric wire part 2 includes the electric wires 21, 22, and 23 of three phases that are bundled in the same direction. The inverter-side connector 8 is connected to one end of the electric wire part 2, and connects the electric wire part 2 and the inverter 50. The motor-side connector 9 is connected to the other end of the electric wire part 2, and connects the electric wire part 2 and the motor 60. As illustrated in FIG. 3, the outer periphery side of the electric wire part 2 is covered with a cylindrical braided wire 6 (shielding member) and a corrugate tube 7 (protect member).

As illustrated in FIG. 3, the electric wires 21, 22, and 23 of three phases in the electric wire part 2 extend along a predetermined axis line X1, and are arranged at equal intervals along the circumferential direction about the axis line X1. Each of the electric wires 21, 22, and 23 of three phases is a non-shielded-type electric wire, and has a conductor part 4 formed in a circular shape as viewed in a cross-sectional view, and an insulation part 5 that covers the outer periphery of the conductor part 4. As illustrated in FIG. 3, the cross-sectional shape of each of the electric wires 21, 22, and 23 in the cross section orthogonal to the axis line X1 is substantially circular shape. The conductor part 4 of each of the electric wires 21, 22, and 23 is, for example, composed of an stranded wire in which a plurality of strands made of metal (aluminum alloy, copper alloy, or the like) are spirally twisted, or a rod-like single core wire. The insulation part 5 of each of the electric wires 21, 22, and 23 is, for example, made of synthetic resin.

The electric wires 21, 22, and 23 of the electric wire part 2 are, in the cross-sectional view illustrated in FIG. 3, arranged in such a manner that the respective center axes (center of gravity) thereof are located to make a substantially equilateral triangle; that is, the electric wires 21, 22, and 23 are arranged in what is called a stacked bale manner. Furthermore, the electric wires 21, 22, and 23 of three phases are arranged in such a manner that two electric wires adjacent to each other in the circumferential direction about the axis line X1 may be brought into contact with each other. Since both of the conductor part 4 and the insulation part 5 of each of the electric wire 21, 22, and 23 have plasticity, the electric wire part 2 is deflectable.

The braided wire 6 is formed in a mesh shape by weaving strands (metal thin wires) made of metal (copper alloy, for example), and formed in a cylindrical shape as a whole. The braided wire 6 surrounds the outer periphery side of the electric wire part 2 as a whole and hence, the braided wire 6 functions as a shielding member that suppresses a noise. The braided wire 6 is, due to the plasticity or the like of the strand, capable of being freely stretched and deformed while following the bending deformation of the electric wire part 2.

The corrugate tube 7 is a tube made of synthetic resin, and is formed in a bellows shape or the like. The corrugate tube 7 is capable of being freely elastically deformed, and excellently holding the cylindrical shape thereof by the elastic restoring force thereof. The corrugate tube 7 houses the electric wire part 2 and the braided wire 6 in the inside of the cylindrical shape thereof, and covers and protects the outer periphery side of the electric wire part 2.

As illustrated in FIG. 2, the core unit 10 in the present embodiment is arranged at the intermediate position in the extending direction of the electric wire part 2. The core unit 10 has a function that lowers a surge voltage in the electric wire part 2. The core unit 10 in the present embodiment has a magnetic substance core 11 and a restriction member 12.

Figure 4:
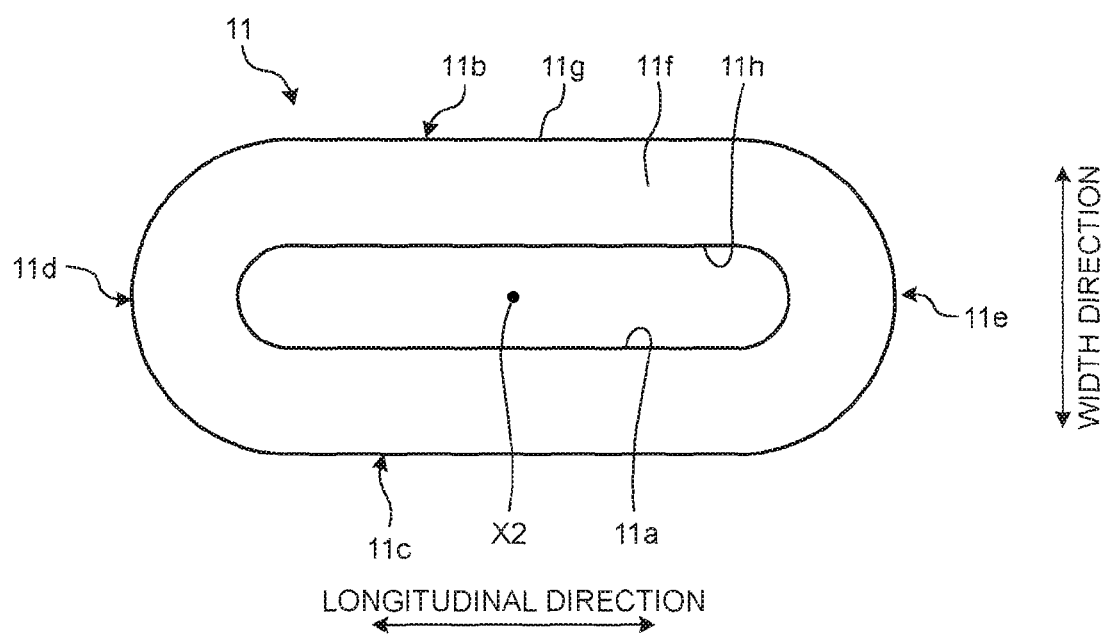
FIG. 4 is a plan view of a magnetic substance core according to the first embodiment.

The magnetic substance core 11 is an annular member formed of a magnetic substance (ferromagnetic substance, such as ferrite). The magnetic substance core 11 in the present embodiment is, as illustrated in FIG. 4, formed in an annular shape as viewed in a cross-sectional view orthogonal to an axis line X2. The magnetic substance core 11 is a hollow columnar member in which a through hole 11a penetrating therethrough in the axial direction is formed. Here, with respect to the magnetic substance core 11, "axial direction" indicates the direction of the axis line X2, "radial direction" indicates the radial direction orthogonal to the axis line X2, and "circumferential direction" indicates the rotational direction about the axis line X2.

The magnetic substance core 11 has a pair of plate-like portions 11b and 11c, and a pair of connection portions 11d and 11e. Each of the plate-like portions 11b and 11c is a flat plate-like constitutional portion. Each of the connection portions 11d and 11e is a plate-like constitutional portion formed in an arcuate shape as viewed in the axial direction. The connection portion 11d connects one ends of the plate-like portions 11b and 11c with each other, and the connection portion 11e connects the other ends of the plate-like portions 11b and 11c with each other. The plate-like portions 11b and 11c and the connection portions 11d and 11e are integrally formed with each other.

Figure 5:
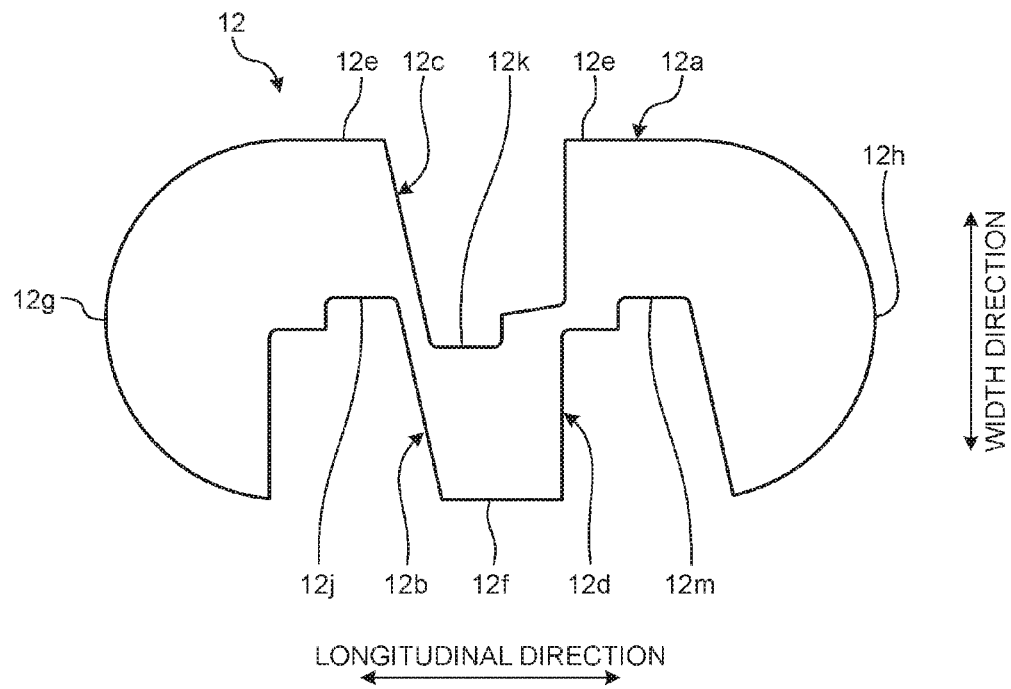
FIG. 5 is a plan view of a restriction member according to the first embodiment.

The restriction member 12 in the present embodiment is a member formed of a raw material, such as metal, having conductivity. As illustrated in FIG. 5, the restriction member 12 has a body 12a to be fixed to one end of the magnetic substance core 11 in the axial direction. The body 12a is brought into contact with an end surface 11f of the magnetic substance core 11 illustrated in FIG. 4. As illustrated in FIG. 5, the shape of the body 12a as viewed in a plan view is a shape where each of both ends of a rectangular shape is formed in a semicircular shape, and cutout portions 12b, 12c, and 12d are formed in remaining straight edge portions. The body 12a has a pair of straight sides 12e and 12f formed in parallel with each other, and a pair of circular sides 12g and 12h each continuously extending between the sides 12e and 12f. In the following explanation, with respect to the body 12a, each of the respective directions of the straight sides 12e and 12f is referred to as "longitudinal direction," and the direction orthogonal to the longitudinal direction as viewed in a plan view is referred to as "width direction."

The cutout portions 12b, 12c, and 12d are formed in edge portions of the body 12a. To be more specific, the second cutout portion 12c is formed in the center portion of one side 12e out of the pair of straight sides 12e and 12f. The first cutout portion 12b and the third cutout portion 12d are formed in respective both end portions of the other side 12f. The first cutout portion 12b and the third cutout portion 12d are formed in such a manner that the first cutout portion 12b and the third cutout portion 12d sandwich the second cutout portion 12c therebetween in the longitudinal direction.

Figure 6:
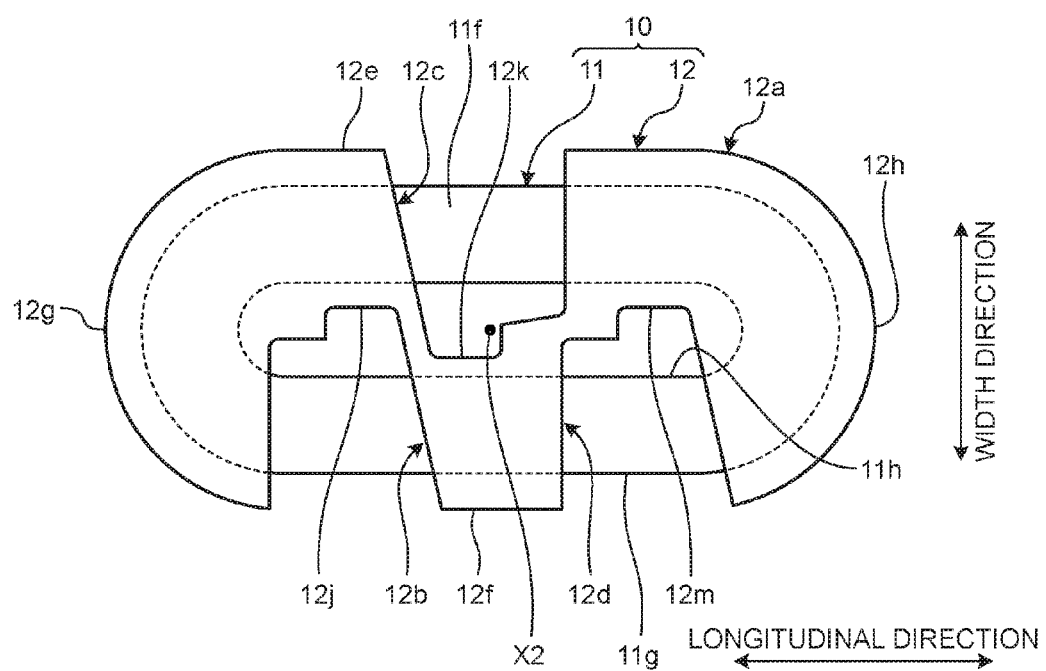
FIG. 6 is a plan view of a core unit according to the first embodiment.

FIG. 6 is a front view illustrating the core unit 10 in a state that the restriction member 12 is fixed to the magnetic substance core 11, as viewed in the axial direction. The restriction member 12 in the present embodiment has a protruding portion to be fitted in the inside diameter side of the magnetic substance core 11. The protruding portion is formed in the rear surface of the body 12a. The restriction member 12 is fixed to the magnetic substance core 11 by fitting the protruding portion in the magnetic substance core 11. As illustrated in FIG. 6, the restriction member 12 is fixed to the magnetic substance core 11 in such a manner that the body 12a covers the end surface 11f of the magnetic substance core 11. To be more specific, the restriction member 12 is fixed to the magnetic substance core 11 in such a manner that each of the sides 12e, 12f, 12g, and 12h of the body 12a is located on the outside of an outer peripheral face 11g of the magnetic substance core 11 in the radial direction. Furthermore, in a state that the restriction member 12 is fixed to the magnetic substance core 11, each of bottom sides 12j, 12k, and 12m of the respective cutout portions 12b, 12c, and 12d is located on the inside of an inner peripheral face 11h of the magnetic substance core 11 in the radial direction.

Here, the bottom sides 12j, 12k, and 12m are sides located in the respective deepest portions of the cutout portions 12b, 12c, and 12d. For example, the bottom side 12j of the first cutout portion 12b is a side located at the deepest position from the side 12f. The cutout portions 12b, 12c, and 12d form, in cooperation with the inner peripheral face 11h, respective openings through which the electric wires 21, 22, and 23 are capable of passing when the electric wires 21, 22, and 23 are wound around the magnetic substance core 11.

Figure 7:
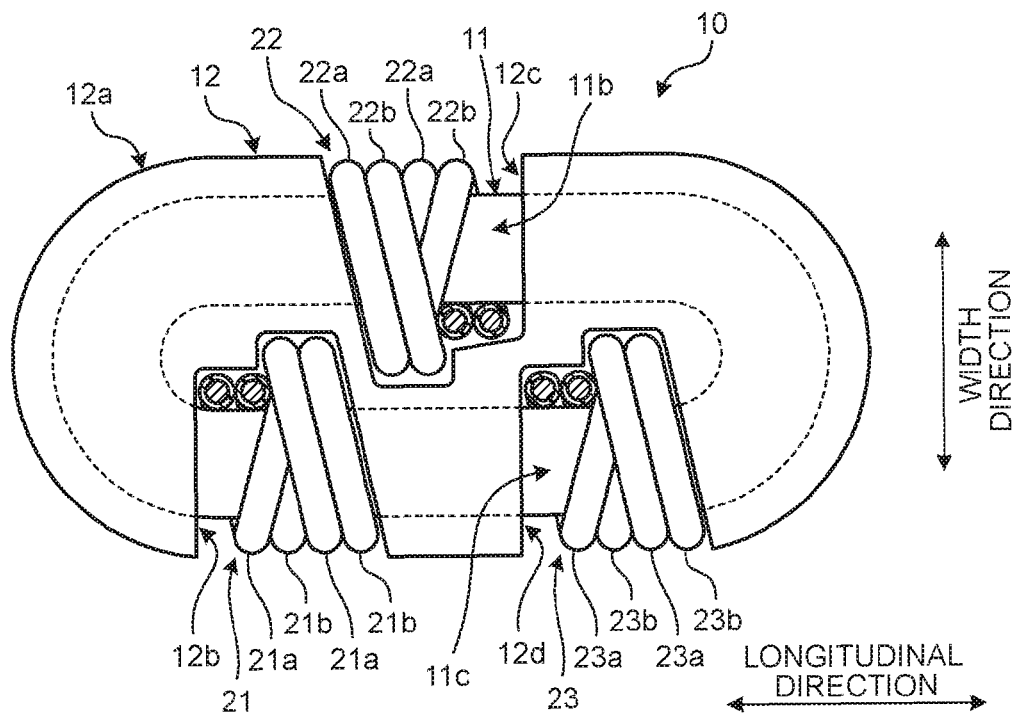
FIG. 7 is a plan view illustrating a state in which electric wires are wound around the core unit according to the first embodiment.
Figure 8:
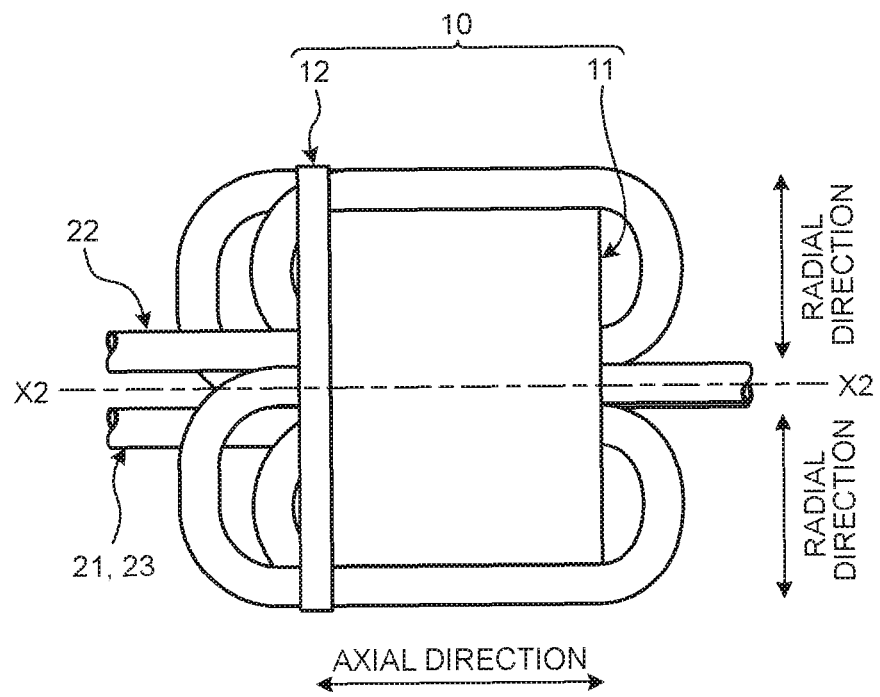
FIG. 8 is a side view illustrating a state in which the electric wires are wound around the core unit according to the first embodiment.

Each of the electric wires 21, 22, and 23 is wound around the magnetic substance core 11 in a state that the restriction member 12 is fixed to the magnetic substance core 11. As illustrated in FIG. 7 and FIG. 8, the electric wires 21, 22, and 23 of plural phases are wound around the magnetic substance core 11 at respective positions that are different from each other about the axis of the magnetic substance core 11. The restriction member 12 restricts, as explained below, the displacement of each of the electric wires 21, 22, and 23 wound around the magnetic substance core 11 about the axis of the magnetic substance core 11. In the wire harness 1 in the present embodiment, the electric wire 22 of a second phase is wound around the center portion of the plate-like portion 11b in the longitudinal direction with the second cutout portion 12c as a guide. The electric wire 22 of the second phase is wound around the plate-like portion 11b a plurality of times while passing through an opening formed between the second cutout portion 12c and the plate-like portion 11b.

The electric wire 21 of a first phase is wound around one end of the plate-like portion 11c in the longitudinal direction with the first cutout portion 12b as a guide. The electric wire 21 of the first phase is wound around the plate-like portion 11c a plurality of times while passing through an opening formed between the first cutout portion 12b and the plate-like portion 11c. The electric wire 23 of a third phase is wound around the other end of the plate-like portion 11c in the longitudinal direction with the third cutout portion 12d as a guide. The electric wire 23 of the third phase is wound around the plate-like portion 11c a plurality of times while passing through an opening formed between the third cutout portion 12d and the plate-like portion 11c. The electric wire 21 of the first phase and the electric wire 23 of the third phase are wound around the plate-like portion 11c in such a manner that the electric wire 21 of the first phase and the electric wire 23 of the third phase sandwich the electric wire 22 of the second phase therebetween in the longitudinal direction, and are spaced apart from the electric wire 22 of the second phase.

In this manner, each of the cutout portions 12b, 12c, and 12d of the restriction member 12 functions as a guide of a winding shape and a winding position of each of the electric wire 21, 22, and 23. For example, the first cutout portion 12b constitutes a guide when the electric wire 21 of the first phase is wound around the plate-like portion 11b of the magnetic substance core 11. To be more specific, the first cutout portion 12b sets the position of the electric wire 21 of the first phase in the longitudinal direction when the electric wire 21 of the first phase is wound around the plate-like portion 11c. Furthermore, the bottom of the first cutout portion 12b is formed in a stepped shape, and guides the position of each layer in the longitudinal direction when the electric wire 21 of the first phase is wound around the plate-like portion 11c in a layered manner. That is, the shape of the first cutout portion 12b is determined in advance based on the target winding shape of the electric wire 21 of the first phase with respect to the magnetic substance core 11, as viewed from the axial direction of the magnetic substance core 11. Accordingly, the electric wire 21 of the first phase is wound around the magnetic substance core 11 with the first cutout portion 12b as a guide thus being wound around the magnetic substance core 11 at a predetermined position while forming a predetermined winding shape. The shape of the first cutout portion 12b is formed in a stepped shape in which the width of the first cutout portion 12b decreases in a step-like manner towards the bottom of the first cutout portion 12b depending on each layer of the electric wire 21 of the first phase that is wound around the plate-like portion 11c in a layered manner thus suppressing the deformation of the winding shape due to the displacement of each layer. In the same manner as above, the second cutout portion 12c functions as a guide when the electric wire 22 of the second phase is wound around the plate-like portion 11b, and the third cutout portion 12d functions as a guide when the electric wire 23 of the third phase is wound around the plate-like portion 11c.

The cutout portions 12b, 12c, and 12d of the restriction member 12 surround the respective electric wires 21, 22, and 23 of each phase wound around the magnetic substance core 11 from the inside of the magnetic substance core 11 in the radial direction. The first cutout portion 12b surrounds the electric wire 21 of the first phase that is wound around the plate-like portion 11c, from the inside of the magnetic substance core 11 in the radial direction, and restricts the relative displacement of the electric wire 21 of the first phase with respect to the magnetic substance core 11. The first cutout portion 12b supports the electric wire 21 of the first phase that is wound around the magnetic substance core 11, from both sides about the axis of the magnetic substance core 11 (namely, both sides in the longitudinal direction). Due to such constitution, the first cutout portion 12b restricts the displacement of the electric wire 21 of the first phase in the longitudinal direction (axial direction of winding). In the same manner as above, the second cutout portion 12c surrounds the electric wire 22 of the second phase that is wound around the center portion of the plate-like portion 11b, from the inside of the magnetic substance core 11 in the radial direction. The second cutout portion 12c supports the electric wire 22 of the second phase from both sides about the axis of the magnetic substance core 11, and restricts the relative displacement of the electric wire 22 of the second phase with respect to the magnetic substance core 11. The third cutout portion 12d surrounds the electric wire 23 of the third phase that is wound around the other end of the plate-like portion 11c, from the inside of the magnetic substance core 11 in the radial direction. The third cutout portion 12d supports the electric wire 23 of the third phase from both sides about the axis of the magnetic substance core 11, and restricts the relative displacement of the electric wire 23 of the third phases with respect to the magnetic substance core 11.

In this manner, one cutout portion surrounds an electric wire of one phase thus maintaining a state that the electric wire 21 of the first phase, the electric wire 22 of the second phase, and the electric wire 23 of the third phase are spaced apart from each other. Furthermore, in the body 12a of the restriction member 12, the cutout portions 12b, 12c, and 12d are arranged in a spaced-apart manner so as to maintain a predetermined inter-wire distance between the electric wire 21 of the first phase, the electric wire 22 of the second phase, and the electric wire 23 of the third phase that are spaced apart from each other. Accordingly, the restriction member 12 is capable of suppressing the increase in electrostatic capacitance C due to the decrease in inter-wire distance between the electric wires 21, 22, and 23 different in phase from each other.

Figure 9:
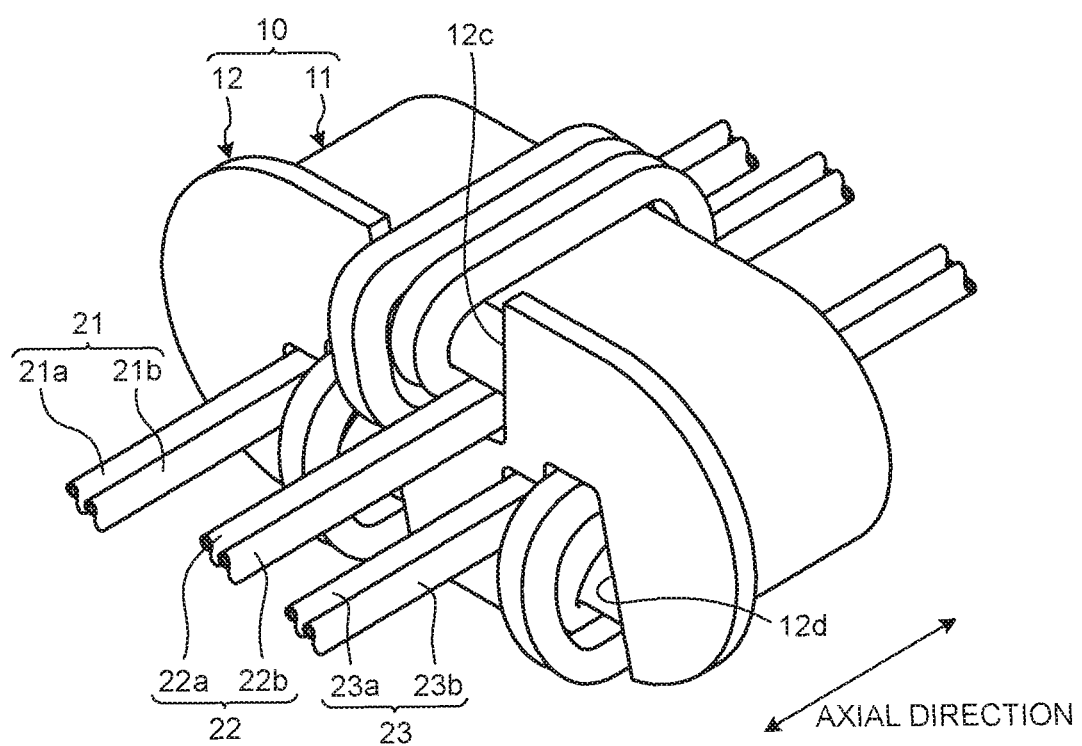
FIG. 9 is a perspective view illustrating a state in which the electric wires are wound around the core unit according to the first embodiment.

In the wire harness 1 in the present embodiment, as explained below, each of the electric wires 21, 22, and 23 of respective phases is branched into two branch lines, which are wound around the magnetic substance core 11. Due to such constitution, an improvement in space factor or the like is achieved. As illustrated in FIG. 2, the electric wire 21 of the first phase is branched into a branch line 21a and a branch line 21b via a branch connector 24 in the intermediate portion of the wire harness 1. As illustrated in FIG. 7 and FIG. 9, each of the branch lines 21a and 21b is wound around the magnetic substance core 11. The electric wire 21 of the first phase is branched into two thin branch lines 21a and 21b, and the branch lines 21a and 21b are wound around the magnetic substance core 11 thus achieving the improvement in space factor. Furthermore, the branch lines 21a and 21b each of which is relatively thin are wound around the magnetic substance core 11 and hence, it is possible to increase the number of times of winding in the same cross-sectional area compared with a case that the electric wires 21 of the first phase per se is wound around the magnetic substance core 11. In addition, a thin electric wire has a merit that a wound portion of the thin electric wire is hardly loosen compared with the case of a thick electric wire.

In the same manner as the case of the electric wire 21 of the first phase, the electric wire 22 of the second phase is branched into a branch line 22a and a branch line 22b via the branch connector 24, and each of the branch lines 22a and 22b is wound around the magnetic substance core 11. The electric wire 23 of the third phase is branched into a branch line 23a and a branch line 23b via the branch connector 24, and each of the branch lines 23a and 23b is wound around the magnetic substance core 11.

As explained heretofore, the core unit 10 according to the first embodiment has the magnetic substance core 11, and the restriction member 12. Furthermore, the wire harness 1 according to the first embodiment has the core unit 10, and the electric wires 21, 22, and 23. The restriction member 12 has the body 12a fixed to one end of the magnetic substance core 11 in the axial direction. In the edge portions of the body 12a, the cutout portions 12b, 12c, and 12d are formed, the cutout portions 12b, 12c, and 12d separately surrounding the respective electric wires 21, 22, and 23 of each phase wound around the magnetic substance core 11 from the inside of the magnetic substance core 11 in the radial direction with the axis (axis line X2) of the magnetic substance core 11 as a center. The cutout portions 12b, 12c, and 12d restrict the respective relative displacements of the electric wires 21, 22, and 23 (change in inter-wire distance between one of the electric wires 21, 22, and 23 and the other one of the electric wires 21, 22, and 23). Accordingly, the core unit 10 according to the first embodiment is capable of suppressing the decrease in cable impedance due to the increase in electrostatic capacitance C between the electric wires 21, 22, and 23. The core unit 10 suppresses the deviation of the cable impedance of the wire harness 1 from a target value, and suppresses the inconsistency of impedance between the inverter 50, the wire harness 1, and the motor 60 to suppress the reflection of a surge. Accordingly, the core unit 10 and the wire harness 1 in the present embodiment are capable of lowering a surge voltage between the inverter 50, the wire harness 1, and the motor 60.

The shape and characteristics of the magnetic substance core 11, and the shape of the restriction member 12 are determined so that the cable impedance of the wire harness 1 becomes a target value. For example, the respective shapes and arrangements of the cutout portions 12b, 12c, and 12d of the restriction member 12 are determined so that the inter-wire distance between the electric wires 21, 22, and 23 becomes a target distance. For example, the shape of the magnetic substance core 11 is not limited to the shape exemplified. Any shape of the magnetic substance core 11 can be adopted provided that the magnetic substance core 11 is formed in an endless closed shape as viewed in a plan view. For example, the magnetic substance core 11 may be formed in a circular shape, a rectangular shape, or a substantially rectangular shape as viewed in a plan view. The target value of the cable impedance of the wire harness 1 is determined so as to maximally match the impedance between the inverter 50, the wire harness 1, and the motor 60.

The shapes of the cutout portions 12b, 12c, and 12d of the restriction member 12 correspond to the respective winding shapes of the electric wires 21, 22, and 23 with respect to the magnetic substance core 11 as viewed from the axial direction of the magnetic substance core 11. That is, the shapes of the cutout portions 12b, 12c, and 12d correspond to the respective contour shapes of the wound portions of the electric wires 21, 22, and 23 in a cross section taken along a plane coplanar with the end surface 11f of the magnetic substance core 11. Accordingly, the restriction member 12 is capable of appropriately guiding the winding positions and the winding shapes of the electric wires 21, 22, and 23 with respect to the magnetic substance core 11.

The cutout portions 12b, 12c, and 12d of the restriction member 12 support the respective electric wires 21, 22, and 23 wound around the magnetic substance core 11 from both sides of the respective electric wires 21, 22, and 23 about the axis of the magnetic substance core 11. Accordingly, the restriction member 12 is capable of effectively restricting the relative displacement (change in inter-wire distance) of each of the electric wires 21, 22, and 23.

Second Embodiment

Figure 10:
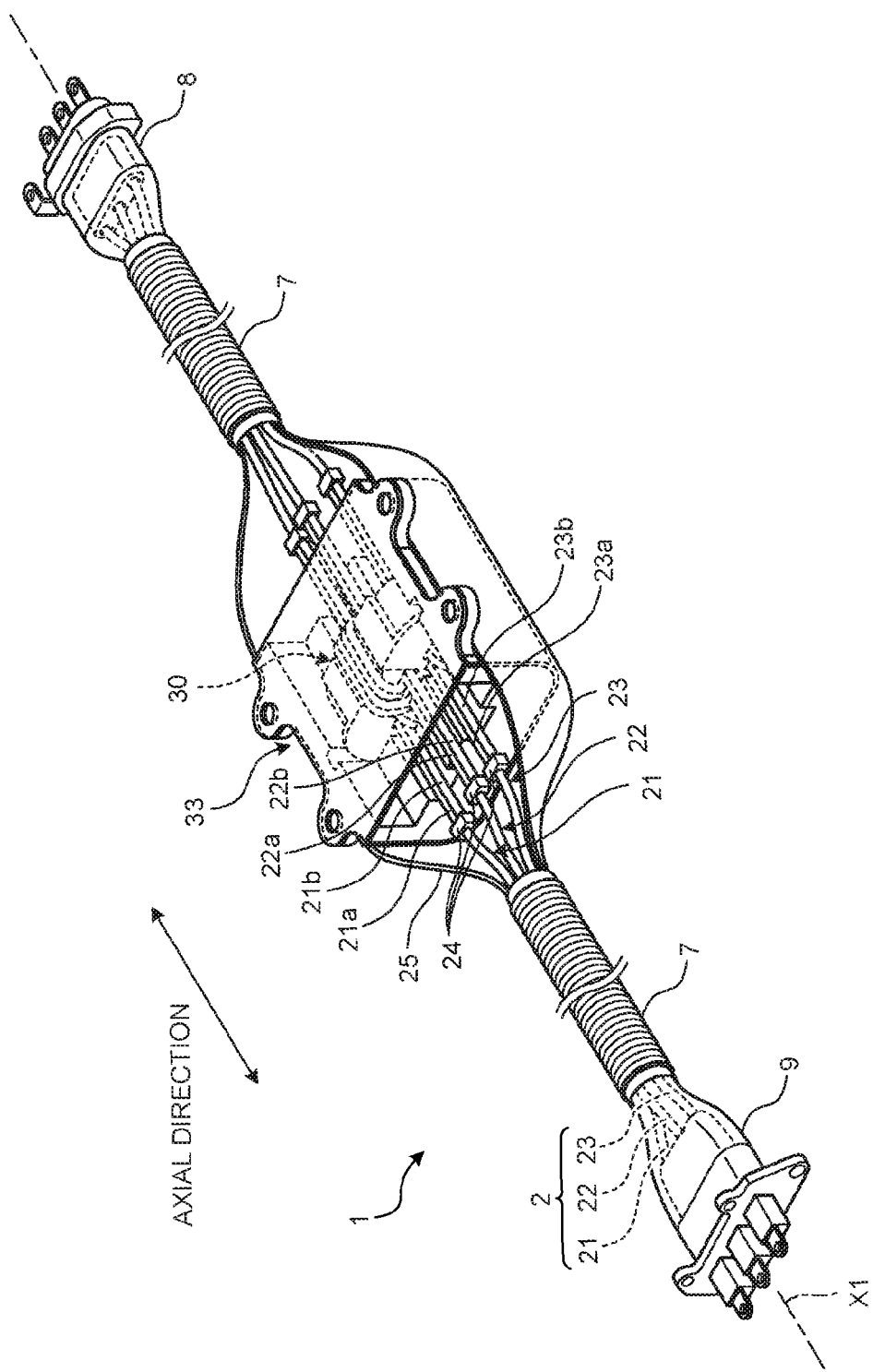
FIG. 10 is a perspective view of a wire harness according to a second embodiment.
Figure 11:
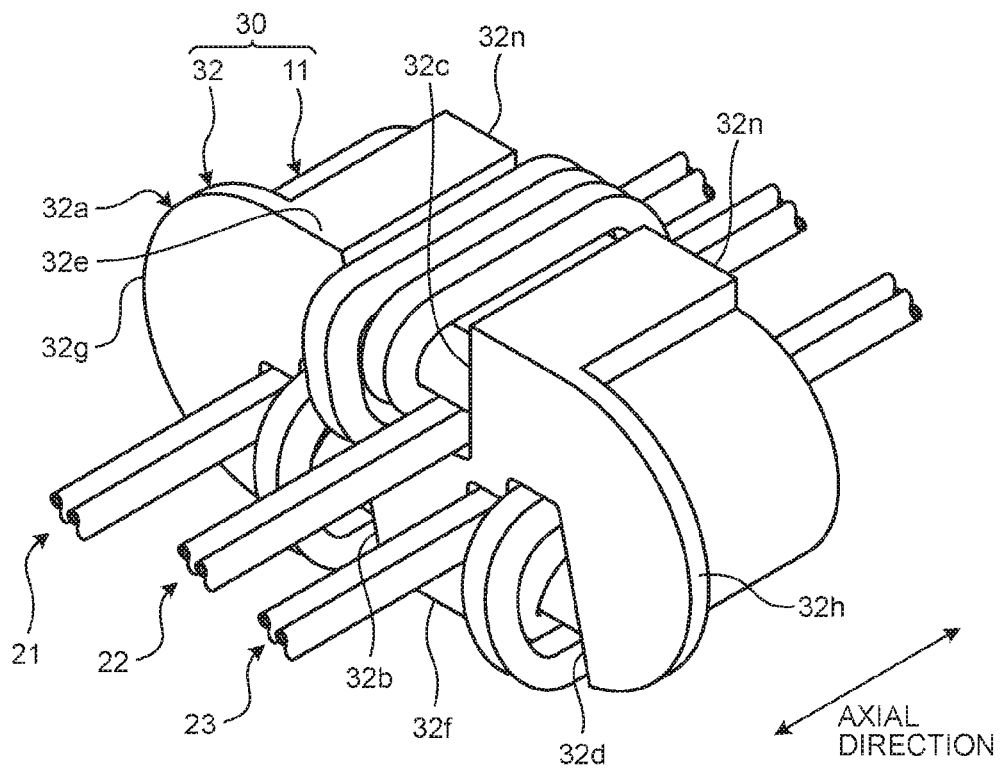
FIG. 11 is a perspective view illustrating a state in which electric wires are wound around a core unit according to the second embodiment.
Figure 12:
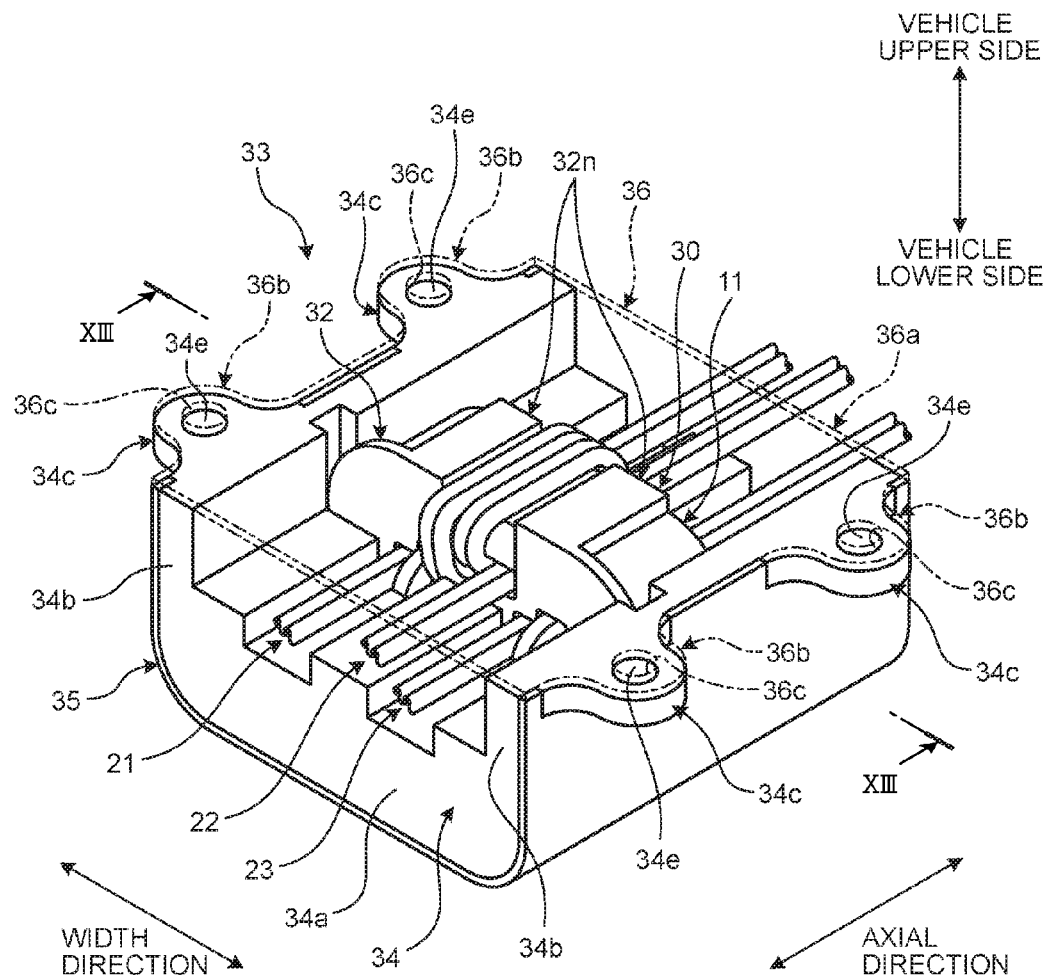
FIG. 12 is a perspective view of the core unit housed in a holding unit.
Figure 13:
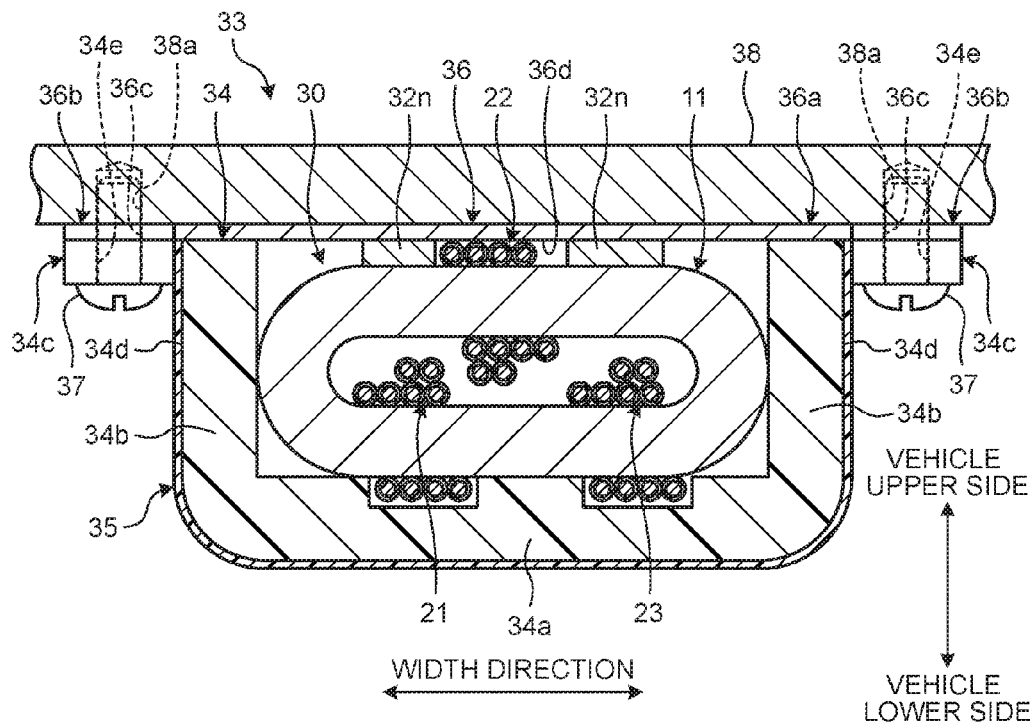
FIG. 13 is a cross-sectional view illustrating a state in which the core unit is attached to a vehicle body.

With reference to FIG. 10 to FIG. 13, a core unit and a wire harness in a second embodiment are explained. In the second embodiment, constitutional features having the identical functions with those explained in the above-mentioned first embodiment are given the same numerals, and their repeated explanations are omitted. FIG. 10 is a perspective view of a wire harness according to the second embodiment. FIG. 11 is a perspective view illustrating a state in which electric wires are wound around a core unit according to the second embodiment. FIG. 12 is a perspective view of the core unit housed in a holding unit. FIG. 13 is a cross-sectional view taken along a line XIII-XIII in FIG. 12, and a cross-sectional view illustrating a state in which the core unit is attached to a vehicle body. A core unit 30 in the second embodiment differs from the core unit 10 in the above-mentioned first embodiment in that a restriction member 32 has conductivity, and the restriction member 32 is grounded to the vehicle-body side.

The wire harness 1 in the second embodiment has the electric wires 21, 22, and 23, the core unit 30, and a holding unit 33. As illustrated in FIG. 11, the core unit 30 according to the second embodiment has the magnetic substance core 11, and the restriction member 32. The magnetic substance core 11 according to the second embodiment is identical with the magnetic substance core 11 in the first embodiment. The restriction member 32 in the second embodiment has a body 32a. The planar shape of the body 32a is identical with the planar shape of the body 12a according to the above-mentioned first embodiment. That is, the body 32a has a pair of straight sides 32e and 32f formed in parallel with each other, and a pair of circular sides 32g and 32h each continuously extending between the sides 32e and 32f. A second cutout portion 32c is formed in the center portion of the straight side 32e in the longitudinal direction. A first cutout portion 32b and a third cutout portion 32d in the second embodiment are formed in respective both ends of the other side 32f in the longitudinal direction. The first cutout portion 32b and the third cutout portion 32d sandwich the second cutout portion 32c therebetween in the longitudinal direction. The electric wires 21, 22, and 23 are wound around the magnetic substance core 11 in the same manner as the case of the above-mentioned first embodiment.

The body 32a of the restriction member 32 according to the second embodiment is a conductive member having connection portions 32n each electrically connected with the holding unit 33. The connection portion 32n is a plate-like constitutional portion that is integrally formed with the body 32a, and constitutes a part of the body 32a. The connection portion 32n projects from the edge portion on the side 32e side of the body 32a toward the magnetic substance core 11 side in the axial direction. The connection portions 32n are formed in respective both sides of the body 32a in the longitudinal direction in such a manner that the connection portions 32n sandwich the second cutout portion 32c therebetween. The body 32a is formed of a raw material having conductivity, such as metal (aluminum alloy, copper alloy, or the like). The connection portion 32n is electrically connected to a vehicle body via the holding unit 33 explained below.

The holding unit 33 illustrated in FIG. 12 is fixed to a vehicle body while holding the core unit 30. The holding unit 33 in the present embodiment is a housing formed in a rectangular parallelepiped shape, and houses the core unit 30 in the inside thereof. As illustrated in FIG. 10, the holding unit 33 is covered with an outer shell part 25 from below. The outer shell part 25 connects the corrugate tube 7 on the inverter 50 side and the corrugate tube 7 on the motor 60 side, and covers the holding unit 33 and the electric wire part 2. As illustrated in FIG. 12 and FIG. 13, the holding unit 33 has a body 34, a shell 35, and a lid member 36. The body 34 is, for example, made of synthetic resin, and has a base plate portion 34a, side wall portions 34b, and fixing portions 34c. The base plate portion 34a, the side wall portions 34b, and the fixing portions 34c are integrally formed. The base plate portion 34a is a constitutional portion formed in a rectangular plate-like shape. The base plate portion 34a supports the core unit 30 from the lower side of the vehicle. The respective side wall portions 34b are located at one end and the other end of the base plate portion 34a in the width direction. The side wall portion 34b projects from the edge portion of the base plate portion 34a toward one side in the thickness direction of the base plate portion 34a. The fixing portion 34c is located at the upper end of the side wall portion 34b; that is, the fixing portion 34c is located at the end portion opposite to the base plate portion 34a side. The fixing portion 34c projects from an outside surface 34d of the side wall portion 34b toward the outside of the base plate portion 34a in the width direction; that is, the fixing portion 34c projects from the surface opposite to the base plate portion 34a side of the side wall portion 34b toward the outside of the base plate portion 34a in the width direction.

Two fixing portions 34c are formed in one side wall portion 34b. A through hole 34e is formed in the fixing portion 34c. The shell 35 is a metal-made plate-like member. The shell 35 covers the body 34 from the outside of the body 34 to protect the body 34.

The lid member 36 is a plate-like member having conductivity, and is formed of metal or the like (aluminum alloy or copper alloy). The lid member 36 has a function as a cover part that covers the core unit 30 placed on the body 34 from above, and a function as a grounding part that grounds the restriction member 32 to the vehicle-body side. The lid member 36 has a body 36a formed in a planar rectangular shape, and fixing portions 36b. The fixing portion 36b projects from the edge portion of the body 36a in the width direction towards the outside of the body 36a in the width direction. The fixing portion 36b is formed in a position corresponding to the fixing portion 34c of the body 34. A through hole 36c corresponding to the through hole 34e of the fixing portion 34c is formed in the fixing portion 36b.

The lid member 36 is placed on the upper end of the side wall portion 34b of the body 34. As illustrated in FIG. 13, a bottom surface 36d of the lid member 36 is brought into contact with the connection portions 32n of the core unit 30 in a state that the lid member 36 is placed on the side wall portions 34b. Consequently, the restriction member 32 and the lid member 36 are electrically connected with each other. The holding unit 33 is, as illustrated in FIG. 13, fixed to the vehicle-body side by using fastening members 37, such as screws. The holding unit 33 in the present embodiment is fixed to a floor panel 38 having conductivity from the lower side of the vehicle. Threaded holes 38a are formed in the floor panel 38. The fastening member 37 is inserted into the through hole 34e of the fixing portion 34c and the through hole 36c of the fixing portion 36b, and thereafter screwed in the threaded hole 38a thus fixing the holding unit 33 to the floor panel 38.

The lid member 36 is brought into contact with the floor panel 38 on at least the fixing portion 36b, and electrically connected with the floor panel 38. Accordingly, the body 32a of the restriction member 32 is electrically connected with the floor panel 38 via the lid member 36, and grounded. The restriction member 32 is electrically connected to the vehicle-body side and hence, the restriction member 32 intercepts the electrostatic capacitance C between the electric wires 21, 22, and 23. Due to such constitution, according to the core unit 30 and the wire harness 1 in the present embodiment, the cable impedance of the wire harness 1 is increased to improve the consistency degree of the impedance in the whole circuit (between the motor 60, the wire harness 1, and the inverter 50) thus suppressing the reflection of a surge.

Furthermore, the restriction member 32 and the lid member 36 in the present embodiment have high heat conductivity. Accordingly, it is possible to efficiently transfer heat generated in the electric wires 21, 22, and 23 and the magnetic substance core 11 to the vehicle-body side. The heat generated in the magnetic substance core 11 and the electric wires 21, 22, and 23 is transferred to the floor panel 38 via the restriction member 32 and the lid member 36. The temperature rise of the magnetic substance core 11 is suppressed thus lowering the temperature characteristics of the magnetic substance core 11 to enhance the magnetic permeability of the magnetic substance core 11, and achieving the miniaturization of the magnetic substance core 11. Furthermore, the electrostatic capacitance C between the electric wires 21, 22, and 23 in the magnetic substance core 11 is lowered thus increasing the cable impedance of the wire harness 1.

As explained heretofore, the wire harness 1 according to the second embodiment includes the holding unit 33 that is fixed to the vehicle body, and holds the core unit 30. The body 32a of the restriction member 32 is a conductive member including the connection portions 32n electrically connected with the holding unit 33. The holding unit 33 electrically connects the connection portions 32n and the vehicle body. According to the wire harness 1 in the second embodiment, it is possible to achieve the increase of the cable impedance.

Third Embodiment

Figure 14:
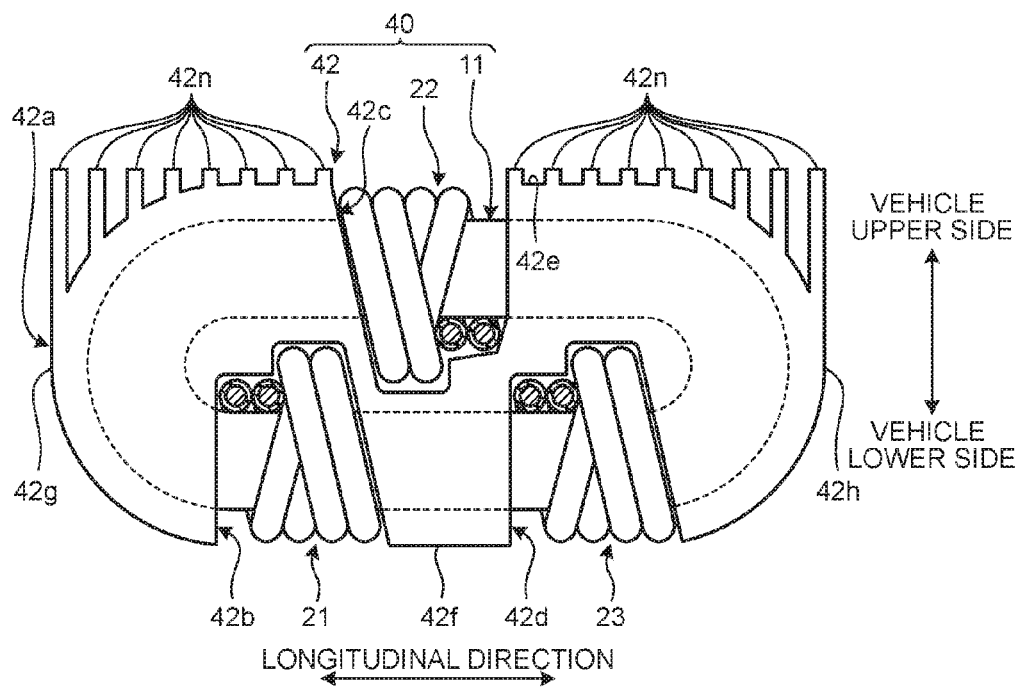
FIG. 14 is a front view illustrating a core unit according to a third embodiment.

A third embodiment is explained with reference to FIG. 14. FIG. 14 is a front view illustrating a core unit according to the third embodiment. A core unit 40 in the third embodiment differs from the core unit 10 in the above-mentioned first embodiment and the core unit 30 in the second embodiment in that a restriction member 42 has fins 42n for heat dissipation. The core unit 40 has the magnetic substance core 11 and the restriction member 42. The magnetic substance core 11 according to the third embodiment is identical with the magnetic substance core 11 of the above-mentioned first embodiment and second embodiment.

As illustrated in FIG. 14, the restriction member 42 in the third embodiment has a body 42a. The planar shape of the body 42a is identical with the shape of the body 12a in the first embodiment and the shape of the body 32a in the second embodiment, except that the body 42a has the fins 42n. The body 42a has a pair of straight sides 42e and 42f formed in parallel with each other, and a pair of circular sides 42g and 42h each continuously extending between the sides 42e and 42f. A second cutout portion 42c is formed in the center portion of the straight side 42e in the longitudinal direction. A first cutout portion 42b and a third cutout portion 42d are formed in respective both end portions of the other side 42f. The first cutout portion 42b and the third cutout portion 42d sandwich the second cutout portion 42c therebetween in the longitudinal direction. The electric wires 21, 22, and 23 are wound around the magnetic substance core 11 in the same manner as each case of the above-mentioned first embodiment and second embodiment.

The restriction member 42 according to the third embodiment has the fins 42n. The fins 42n are formed in the side 42e side of the restriction member 42, and project toward a side opposite to the side 42f. The fins 42n are arranged at predetermined intervals along the longitudinal direction. The core unit 40 is, as illustrated in FIG. 14, arranged so that the fins 42n are located on the vehicle upper side of the restriction member 42. The core unit 40 is, in the same manner as the core unit 30 in the above-mentioned second embodiment, fixed to the floor panel 38 or the like in a state that the core unit 40 is housed in the inside of the holding unit 33. The fins 42n are formed so as to be brought into contact with the lid member 36 in a state that the core unit 40 is housed in the holding unit 33. Here, when the restriction member 42 has the connection portions 32n in the same manner as the case of the restriction member 32 in the above-mentioned second embodiment, the connection portions 32n and the fins 42n are brought into contact with the lid member 36.

When heat is generated in the magnetic substance core 11 and the electric wires 21, 22, and 23, the heat is not only directly dissipated in the air but also transferred to the body 42a of the restriction member 42, and the heat is also radiated from the body 42a and the fins 42n. Furthermore, the heat transferred to the fins 42n is transferred to the floor panel 38 via the lid member 36. The temperature rise of the magnetic substance core 11 is suppressed thus lowering the temperature characteristics of the magnetic substance core 11 to enhance the magnetic permeability of the magnetic substance core 11, and achieving the miniaturization of the magnetic substance core 11. Furthermore, the electrostatic capacitance C between the electric wires 21, 22, and 23 in the magnetic substance core 11 is lowered thus increasing the cable impedance of the wire harness 1.

Modifications of Each Embodiment

The modifications of the first embodiment to the third embodiment are explained. The restriction members 12, 32, and 42 may be fixed to the magnetic substance core 11 after the electric wires 21, 22, and 23 are wound around the magnetic substance core 11. The restriction members 12, 32, and 42 may be fixed to the magnetic substance core 11 by adhesion.

The wire harness 1 may have a plurality of core units 10, 30, and 40. For example, when the wire harness 1 in the first embodiment has a plurality of core units 10, the core units 10 are arranged at predetermined intervals along the axis line X1. The number of the core units 10 and the predetermined interval are optionally determined so that the cable impedance of the wire harness 1 becomes a target value.

The contents disclosed in the above-mentioned embodiments and modifications can be brought into practice by optionally combining the embodiments and the modifications with each other.

The core unit according to the embodiment includes the magnetic substance core formed in an annular shape, and the restriction member that restricts the displacement of the electric wire wound around the magnetic substance core about the axis of the magnetic substance core. The restriction member has the body fixed to one end of the magnetic substance core in the axial direction. In the edge portion of the body, the plurality of cutout portions that separately surround the respective electric wires of each phase wound around the magnetic substance core from the inside of the magnetic substance core in the radial direction with the axis of the magnetic substance core as a center are formed. The wire harness according to the embodiment includes the magnetic substance core, the electric wires of plural phases that are wound around the magnetic substance core at respective positions that are different from each other about the axis of the magnetic substance core, and the restriction member. The electric wires of each phase are separately surrounded by the respective cutout portions of the restriction member. The core unit and the wire harness according to the embodiment achieve the advantageous effect that the decrease of the cable impedance caused by the electric wires of different phase approaching to each other can be suppressed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A core unit comprising:
a magnetic substance core formed in an annular shape, electric wires of plural phases being wound around the magnetic substance core at respective positions that are different from each other about an axis of the magnetic substance core; and
a restriction member configured to restrict displacement of the electric wires about the axis of the magnetic substance core, the electric wires being wound around the magnetic substance core, wherein
the restriction member includes a body fixed to one end of the magnetic substance core in the axial direction of the magnetic substance core, and
a plurality of cutout portions are formed in edge portions of the body, the cutout portions are configured to surround the respective electric wires of each phase wound around the magnetic substance core separately from an inside of the magnetic substance core in a radial direction with the axis of the magnetic substance core as a center.

2. The core unit according to claim 1, wherein shapes of the cutout portions correspond to respective winding shapes of the electric wires with respect to the magnetic substance core as viewed from the axial direction of the magnetic substance core.

3. The core unit according to claim 1, wherein
each of the cutout portions supports the corresponding electric wire wound around the magnetic substance core from both sides about the axis of the magnetic substance core.

4. The core unit according to claim 2, wherein
each of the cutout portions supports the corresponding electric wire wound around the magnetic substance core from both sides about the axis of the magnetic substance core.

5. The core unit according to claim 1, wherein
the restriction member further includes a plurality of fins that project upwardly.

6. The core unit according to claim 2, wherein
the restriction member further includes a plurality of fins that project upwardly.

7. The core unit according to claim 3, wherein
the restriction member further includes a plurality of fins that project upwardly.

8. A wire harness comprising:
a magnetic substance core formed in an annular shape;
electric wires of plural phases, the electric wires being wound around the magnetic substance core at respective positions that are different from each other about an axis of the magnetic substance core; and
a restriction member configured to restrict displacement of the electric wires about the axis of the magnetic substance core, the electric wires being wound around the magnetic substance core, wherein
the restriction member includes a body fixed to one end of the magnetic substance core in the axial direction of the magnetic substance core, the body including a plurality of cutout portions formed in edge portions of the body, and
the cutout portions separately surround the respective electric wires of each phase wound around the magnetic substance core from an inside of the magnetic substance core in a radial direction with the axis of the magnetic substance core as a center.

9. The wire harness according to claim 8 further comprising:
a holding unit that is fixed to a vehicle body and configured to hold the magnetic substance core and the restriction member, wherein the body of the restriction member is a conductive member including a connection portion electrically connected with the holding unit, and the holding unit electrically connects the connection portion and the vehicle body.

* * * * *